(12) United States Patent
Kato et al.

(10) Patent No.: US 9,695,304 B2
(45) Date of Patent: Jul. 4, 2017

(54) RUBBER COMPOSITION FOR TIRE BEAD INSULATION AND PNEUMATIC TIRE

(71) Applicant: THE YOKOHAMA RUBBER CO., LTD., Minato-Ku, Tokyo (JP)

(72) Inventors: Manabu Kato, Hiratsuka (JP); Ryota Takahashi, Hiratsuka (JP); Takahiro Okamatsu, Hiratsuka (JP); Yoshiaki Kirino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 15/311,288

(22) PCT Filed: Dec. 19, 2014

(86) PCT No.: PCT/JP2014/083761
§ 371 (c)(1),
(2) Date: Nov. 15, 2016

(87) PCT Pub. No.: WO2015/173991
PCT Pub. Date: Nov. 19, 2015

(65) Prior Publication Data
US 2017/0107357 A1  Apr. 20, 2017

(30) Foreign Application Priority Data
May 16, 2014  (JP) ................................. 2014-102231

(51) Int. Cl.
*C08L 7/00* (2006.01)
*B60C 1/00* (2006.01)

(52) U.S. Cl.
CPC  *C08L 7/00* (2013.01); *B60C 1/00* (2013.01); *B60C 2001/005* (2013.04)

(58) Field of Classification Search
CPC ......................................................... C08L 7/00
USPC .......................................................... 523/160
See application file for complete search history.

(56) References Cited

U.S. PATENT DOCUMENTS

| | | | |
|---|---|---|---|
| 2008/0163971 A1* | 7/2008 | Pawlikowski | B60C 11/0311 152/545 |
| 2010/0317778 A1* | 12/2010 | Gerster | C07F 7/1836 524/133 |
| 2013/0207043 A1 | 8/2013 | Menozzi et al. | |
| 2015/0322190 A1* | 11/2015 | Takahashi | C08F 236/10 525/332.9 |

FOREIGN PATENT DOCUMENTS

| | | |
|---|---|---|
| JP | 2008-127464 A | 6/2008 |
| JP | 2010-132011 A | 6/2010 |
| JP | 2010-241898 A | 10/2010 |
| JP | 2013-159717 A | 8/2013 |
| JP | 2013-543516 A | 12/2013 |
| WO | WO 2014/077364 | * 5/2014 |

* cited by examiner

*Primary Examiner* — Doris Lee
(74) *Attorney, Agent, or Firm* — Carrier Blackman & Associates, P.C.; Joseph P. Carrier; Anne G. Sabourin

(57) ABSTRACT

A rubber composition for tire bead insulation contains a diene rubber, a nitrone compound having a carboxy group, a carbon black and a white filler. The diene rubber contains a natural rubber and a styrene-butadiene rubber and the mass ratio of the contents of the natural rubber and the butadiene rubber is from 50:50 to 90:10. The content of the nitrone compound is from 0.1 to 10 parts by mass (PBM) per 100 PBM of total content of the diene rubber and the nitrone compound. The content of the carbon black is not less than 70 PBM per 100 PBM of the total above. The content of the white filler is not less than 20 PBM per 100 PBM of the total above. The total content of the carbon black and the white filler is from 90 to 180 PBM per 100 PBM of the total above.

20 Claims, 1 Drawing Sheet

RUBBER COMPOSITION FOR TIRE BEAD INSULATION AND PNEUMATIC TIRE

TECHNICAL FIELD

The present invention relates to a rubber composition for tire tread insulation and a pneumatic tire.

BACKGROUND ART

In a pneumatic tire, a bead portion (bead core) is configured with a bead wire and a bead insulation rubber. The bead insulation rubber requires a superior adhesion toward a wire because it plays a role in bundling and integrating bead wires.

As such, a rubber composition for tire bead insulation containing a natural rubber, a styrene-butadiene rubber (SBR), a specified esterified compound, a carbon black and an inorganic filler is disclosed in Patent Document 1 (Claims, Examples). It is described that the disclosed rubber composition exhibits superior adhesion toward wires when formed into a bead insulation rubber.

CITATION LIST

Patent Literature

Patent Document 1: Japanese Unexamined Patent Application Publication No. 2010-132011A

SUMMARY OF INVENTION

Technical Problem

Meanwhile, further improvement of adhesion of the bead insulation rubber to a wire is pursued as the demand for superior tire durability increases.

In recent years, improvement toward lower heat build-up in a bead insulation rubber is also pursued due to an increased demand for improved fuel economy from the viewpoint of environmental concerns.

The present inventors have produced a bead core using the rubber composition containing a natural rubber, an SBR, a carbon black and an inorganic filler according to Patent Document 1, and discovered that further improvement in adhesion of a bead insulation rubber toward a wire is necessary considering increased demand for superior durability requirement in the future. Also, the present inventors discovered that heat build-up of the obtained bead insulation rubber was not low enough to satisfy the requirement of recent years.

In consideration of the circumstances above, an object of the present invention is to provide a rubber composition for tire bead insulation that has excellent low heat build-up and adhesion, when formed into a bead insulation rubber; and a pneumatic tire including the rubber composition in a bead insulation portion.

Solution to Problem

The present inventors have conducted diligent research on the above problems, and discovered that the above problem can be solved by blending a nitrone compound having a carboxy group or by modifying SBR in the compound with the nitrone compound above, and completed the present invention.

Specifically, the inventors discovered that the object described above can be achieved by the following features.

(1) A rubber composition for tire bead insulation containing a diene rubber, a nitrone compound having a carboxy group, a carbon black and a white filler;

the diene rubber containing a natural rubber and a styrene-butadiene rubber, in which a mass ratio of a content of the natural rubber and a content of the butadiene rubber is from 50:50 to 90:10;

a content of the nitrone compound being from 0.1 to 10 parts by mass per 100 parts by mass of a total content of the diene rubber and the nitrone compound;

a content of the carbon black being not less than 70 parts by mass per 100 parts by mass of a total content of the diene rubber and the nitrone compound;

a content of the white filler being not less than 20 parts by mass per 100 parts by mass of a total content of the diene rubber and the nitrone compound; and a total content of the carbon black and the white filler being from 90 to 180 parts by mass per 100 parts by mass of a total content of the diene rubber and the nitrone compound.

(2) A rubber composition for tire bead insulation containing a diene rubber, a carbon black and a white filler;

the diene rubber containing a natural rubber and a modified styrene-butadiene rubber, in which the modified styrene-butadiene rubber is obtained by a reaction of a nitrone compound having a carboxy group with a double bond of a styrene-butadiene rubber;

a mass ratio of a content of the natural rubber and a content of a styrene-butadiene rubber used for a synthesis of the modified styrene-butadiene rubber is from 50:50 to 90:10;

a content of the nitrone compound used for a synthesis of the modified styrene-butadiene rubber being from 0.1 to 10 parts by mass per 100 parts by mass of the diene rubber;

a content of the carbon black being not less than 70 parts by mass per 100 parts by mass of the diene rubber;

a content of the white filler being not less than 20 parts by mass per 100 parts by mass of the diene rubber; and a total content of the carbon black and the white filler being from 90 to 180 parts by mass per 100 parts by mass of the diene rubber.

(3) The rubber composition for tire bead insulation according to (2) above, in which a degree of modification of the modified styrene-butadiene rubber is from 0.02 to 4.0 mol %, where "degree of modification" refers to a proportion (mol %) of double bonds modified with the nitrone compound relative to all the double bonds attributed to butadiene in styrene-butadiene rubber.

(4) The rubber composition for tire bead insulation according any one of (1) to (3) above, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

(5) The rubber composition for tire bead insulation according to any one of (1) to (4) above, wherein a styrene unit content of the styrene-butadiene rubber is not less than 10 mass %.

(6) A pneumatic tire wherein the rubber composition for tire bead insulation described in any one of (1) to (5) above is used in a bead insulation portion.

Advantageous Effects of Invention

As described below, according to the present invention, a rubber composition for bead insulation exhibiting excellent low heat build-up and adhesion when formed into a bead insulation rubber, and a pneumatic tire including the rubber composition can be provided.

Note that "exhibiting excellent low heat build-up when formed into a bead insulation rubber" is referred to as "exhibiting excellent low heat build-up" hereinafter. Note that "exhibiting excellent adhesion when formed into a bead insulation rubber" is referred to as "exhibiting excellent adhesion" hereinafter.

DESCRIPTION OF EMBODIMENTS

Figure 1:
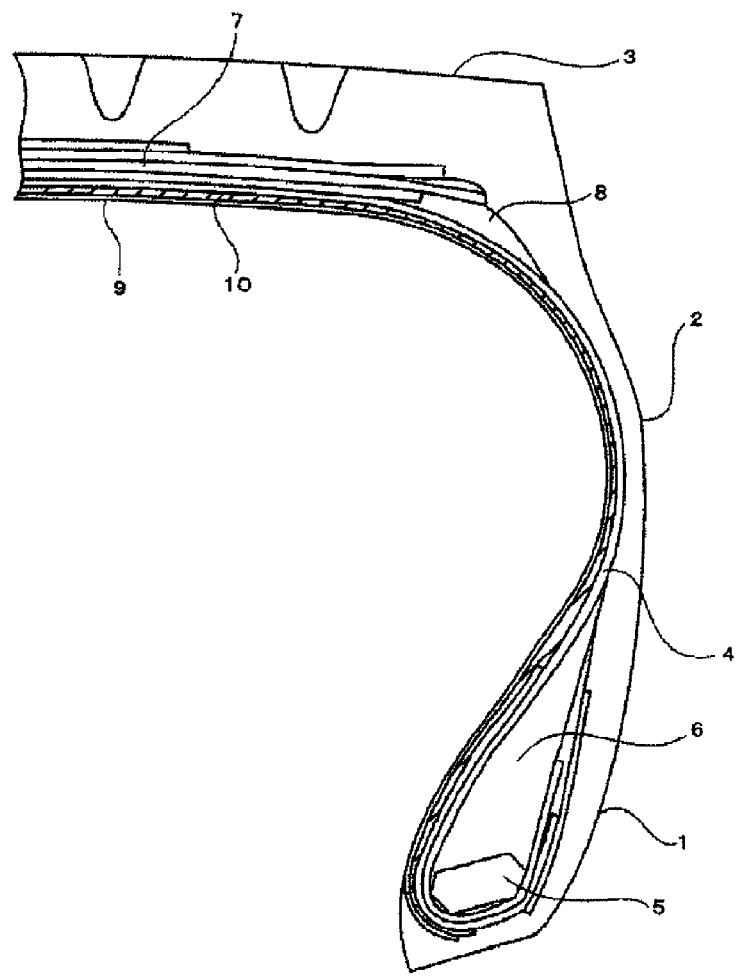
FIG. 1 is a partial cross-sectional schematic view of a tire that illustrates one embodiment of a pneumatic tire of the present invention.

Hereinafter, a rubber composition for tire bead insulation of the present invention and a pneumatic tire in which the rubber composition for tire bead insulation of the present invention is used in a bead insulation portion will be described.

Note that, in the present specification, numerical ranges indicated using "(from) . . . to . . . " include the former number as the lower limit value and the later number as the upper limit value.

Rubber Composition for Tire Bead Insulation

A rubber composition for tire bead insulation according to a first aspect of the present invention (also referred to as "composition of the present invention" hereinafter) contains a diene rubber, a nitrone compound having a carboxy group (also referred to as a "carboxynitrone" hereinafter), a carbon black and a white filler. The diene rubber contains a natural rubber and a styrene-butadiene rubber, and the mass ratio of the content of the diene rubber and the content of the styrene-butadiene rubber is from 50:50 to 90:10. In addition, the content of the nitrone compound is from 0.1 to 10 parts by mass per 100 parts by mass of a total content of the diene rubber and the nitrone compound;

the content of the carbon black is not less than 70 parts by mass per 100 parts by mass of a total content of the diene rubber and the nitrone compound;

the content of the white filler is not less than 20 parts by mass per 100 parts by mass of a total content of the diene rubber and the nitrone compound; and a total content of the carbon black and the white filler is from 90 to 180 parts by mass per 100 parts by mass of a total content of the diene rubber and the nitrone compound.

A composition according to a second aspect of the present invention contains a diene rubber, a carbon black and a white filler.

The diene rubber contains a natural rubber and a modified styrene-butadiene rubber (also referred to as a "carboxynitrone-modified SBR" hereinafter) which can be obtained by a reaction of a nitrone compound having a carboxy group with a double bond of a styrene-butadiene rubber.

The mass ratio of the content of the natural rubber and the content of a styrene-butadiene rubber used for the synthesis of the modified styrene-butadiene rubber is from 50:50 to 90:10. In addition, the content of the nitrone compound used for the synthesis of the modified styrene-butadiene rubber is from 0.1 to 10 parts by mass per 100 parts by mass of the diene rubber;

the content of the carbon black is not less than 70 parts by mass per 100 parts by mass of the diene rubber;

the content of the white filler is not less than 20 parts by mass per 100 parts by mass of the diene rubber; and the total content of the carbon black and the white filler is from 90 to 180 parts by mass per 100 parts by mass of the diene rubber.

The second aspect of the present invention corresponds to an aspect in which SBR in the diene rubber is modified with the carboxynitrone instead of blending carboxynitrone in the first aspect of the composition of the present invention described above.

The compositions of the present invention (the first aspect, the second aspect) exhibit superior low heat build-up and adhesion presumably due to the above-described configuration. Although the reason is not clear, it is assumed to be as follows.

The composition of the present invention contains carboxynitrone or SBR modified with carboxynitrone, as described above. Therefore, if a bead core is formed using the composition of the present invention, it exhibits excellent adhesion presumably due to an affinity between a carboxy group and a wire, the carboxy group being attributed to a carboxynitrone (or a carboxynitrone after modification) in the bead insulation rubber. Furthermore, a carboxy group attributed to a carboxynitrone (or a carboxynitrone after modification) interacts with a carbon black and a white filler in the composition, thus increasing the dispersibility of the carbon black and white filler. As a result, it is conceived that the Payne effect is reduced, and excellent low heat build-up is exhibited. That is, the first aspect and the second aspect supposedly exhibit desired effects via the same mechanism.

The first aspect and the second aspect of the composition of the present invention are described in detail below.

First Aspect

As described above, the composition according to the first aspect of the present invention (also simply referred to as the first aspect hereinafter) contains a diene rubber, a nitrone compound having a carboxy group, a carbon black, and a white filler. The diene rubber contains a natural rubber and a styrene-butadiene rubber.

Each component contained in the first aspect will be described in detail hereinafter.

Diene Rubber

The diene rubber contained in the first aspect contains a natural rubber and a styrene-butadiene rubber.

The diene rubber may contain a rubber component besides a natural rubber and a styrene-butadiene rubber. Such a rubber component is not particularly limited; examples thereof include isoprene rubber (IR), butadiene rubber (BR), acrylonitrile-butadiene copolymer rubber (NBR), butyl rubber (IIR), butyl halide rubber (Br-IIR, Cl-IIR), and chloroprene rubber (CR).

Natural Rubber

The natural rubber contained in the diene rubber is not particularly limited.

The content of the natural rubber in the diene rubber is not particularly limited, but preferably from 50 to 90 mass %.

Styrene-Butadiene Rubber

The styrene-butadiene rubber contained in the diene rubber is not particularly limited.

The styrene monomer used for the production of a styrene-butadiene rubber is not particularly limited, but examples thereof include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4- dimethylstyrene, 4-t-butylstyrene, 5-t-butyl-2-methylstyrene, dimethylaminomethylstyrene, and dimethylaminoethylstyrene. Among these, styrene, α-methylstyrene, and 4-methylstyrene are preferred, and styrene is more preferred. Such a styrene monomer may be used alone, or a combination of two or more types may be used.

Examples of the butadiene monomer used for the production of the styrene-butadiene rubber is not particularly limited, but examples thereof include 1,3-butadiene, isoprene(2-methyl-1,3-butadiene), 2,3-dimethyl-1,3-butadiene, and 2-chloro-1,3-butadiene. Among these, 1,3-butadiene or isoprene is preferred, and 1,3-butadiene is more preferred. Such a butadiene monomer may be used alone, or a combination of two or more types may be used.

The content of styrene units in the styrene-butadiene rubber is not particularly limited, but preferably not less than 10 mass %. Of these, the content of styrene units is more preferably from 15 to 30 mass %. Note that the "content of styrene units in a styrene-butadiene rubber" refers to a proportion (mass %) of styrene monomer units in a styrene-butadiene rubber.

From the viewpoint of ease of handling, the weight average molecular weight (Mw) of styrene-butadiene rubber above is preferably from 100,000 to 1,500,000 and more preferably from 300,000 to 1,300,000. In the present specification, the weight average molecular weight (Mw) is measured by gel permeation chromatography (GPC) based on calibration with polystyrene standards using tetrahydrofuran as a solvent.

The content of the styrene-butadiene rubber in the diene rubber is not particularly limited, but is preferably from 10 to 50 mass %.

The total content of the natural rubber and the styrene-butadiene rubber in the diene rubber is not particularly limited, but preferably not less than 90 mass %.

In the diene rubber above, the mass ratio of the content of the natural rubber and the content of the styrene-butadiene rubber is from 50:50 to 90:10. In particular, it is preferably from 60:40 to 80:20. In the diene rubber above, if the mass ratio of the content of the natural rubber and the content of the styrene-butadiene rubber is out of a range from 50:50 to 90:10, low heat build-up and adhesion are insufficient.

Nitrone Compound Having a Carboxy Group

As described above, a nitrone compound having a carboxy group (carboxynitrone) is contained in the first aspect.

The carboxynitrone is not particularly limited as long as it is a nitrone that has at least one carboxy group (—COOH). The nitrone herein refers to a compound having a nitrone group represented by Formula (1) below.

[Chemical Formula 1]

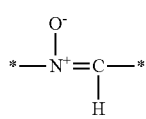

Formula (1)

In Formula (1), * indicates a bond position.

The carboxynitrone is preferably a compound represented by Formula (b) below.

[Chemical Formula 2]

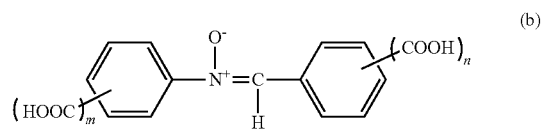

(b)

In Formula (b), m and n each independently represent an integer of 0 to 5, and the sum of m and n is 1 or greater.

The integer represented by m is preferably an integer of 0 to 2, and more preferably an integer of 0 or 1, because solubility to a solvent during carboxynitrone synthesis will be better and thus synthesis will be easier.

The integer represented by n is preferably an integer of 0 to 2, and more preferably an integer of 0 or 1, because solubility to a solvent during carboxynitrone synthesis will be better and thus synthesis will be easier.

Furthermore, the sum of m and n (m+n) is preferably from 1 to 4, and more preferably 1 or 2.

The compound is not particularly limited to a carboxynitrone such as that represented by Formula (b) but is preferably a compound selected from the group consisting of N-phenyl-α-(4-carboxyphenyl)nitrone represented by Formula (b1) below, N-phenyl-α-(3-carboxyphenyl)nitrone represented by Formula (b2) below, N-phenyl-α-(2-carboxyphenyl)nitrone represented by Formula (b3) below, N-(4-carboxyphenyl)-α-phenylnitrone represented by Formula (b4) below, N-(3-carboxyphenyl)-α-phenylnitrone represented by Formula (b5) below, and N-(2-carboxyphenyl)-α-phenylnitrone represented by Formula (b6) below.

[Chemical Formula 3]

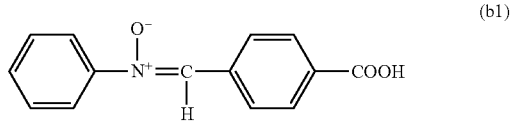

(b1)

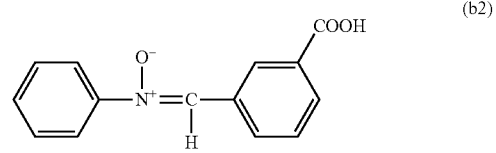

(b2)

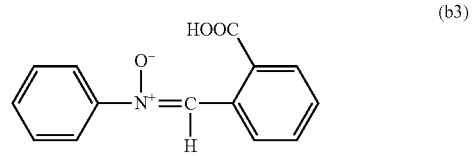

(b3)

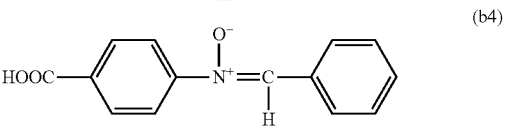

(b4)

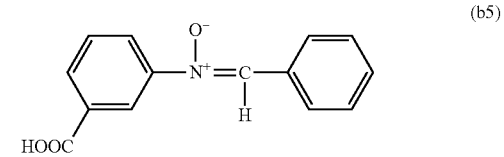

(b5)

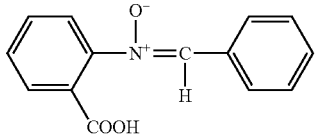
(b6)

The method of synthesizing the carboxynitrone is not particularly limited, and conventionally known methods can be used. For example, a compound (carboxynitrone) having a carboxy group and a nitrone group can be obtained by stirring a compound having a hydroxyamino group (—NHOH) and a compound having an aldehyde group (—CHO) and a carboxy group at a molar ratio of hydroxyamino group to aldehyde group (—NHOH/—CHO) of 1.0 to 1.5 in the presence of an organic solvent (for example methanol, ethanol, tetrahydrofuran, and the like) at room temperature for 1 to 24 hours to allow the both groups to react.

In the first aspect, the content of the nitrone compound having a carboxy group is from 0.1 to 10 parts by mass per 100 parts by mass of total of the diene rubber and the nitrone compound. In particular, it is preferably from 0.5 to 5 parts by mass. If the content of the nitrone compound having a carboxy group is out of the range from 0.1 to 10 parts by mass per 100 parts by mass of total of the diene rubber and the nitrone compound, low heat build-up and/or adhesion are insufficient.

Carbon Black

The carbon black contained in the first aspect is not particularly limited and, for example, carbon blacks with various grades, such as SAF-HS, SAF, ISAF-HS, ISAF, ISAF-LS, IISAF-HS, HAF-HS, HAF, HAF-LS, FEF, GPF or SRF can be used.

The nitrogen adsorption specific surface area ($N_2SA$) of the carbon black is not particularly limited, but is preferably from $20 \times 10^3$ to $60 \times 10^3$ $m^2/kg$.

Note that the nitrogen adsorption specific surface area ($N_2SA$) is a value of the amount of nitrogen adsorbed to a surface of carbon black, measured in accordance with JIS K6217-2:2001 (Part 2: Determination of specific surface area—Nitrogen adsorption methods—Single-point procedures).

In the first aspect, the content of carbon black is not less than 70 parts by mass per 100 parts by mass of total of the diene rubber and the nitrone compound. In particular, it is preferably from 80 to 150 parts by mass. If the content of carbon black is less than 70 parts by mass per 100 parts by mass of total of the diene rubber and the nitrone compound, the strength of the compound after vulcanization is insufficient.

White Filler

A white filler contained in the first aspect is not particularly limited, and examples include a silica, calcium carbonate, magnesium carbonate, talc, clay, alumina, aluminum hydroxide, titanium dioxide, and calcium sulfate. For the white filler, one type may be used alone, or two or more types may be used in combination.

The white filler is preferably other than silica and preferably clay.

In the first aspect, the content of the white filler is not less than 20 parts by mass per 100 parts by mass of total of the diene rubber and the nitrone compound. In particular, it is preferably from 40 to 100 parts by mass. If the content of the white filler is less than 20 parts by mass per 100 parts by mass of total of the diene rubber and the nitrone compound, the strength of the compound after vulcanization is insufficient.

In the first aspect, the total content of the carbon black and the white filler is from 90 to 180 parts by mass per 100 parts by mass of total of the diene rubber and the nitrone compound. In particular, it is preferably from 100 to 160 parts by mass. If the total content of the carbon black and the white filler is less than 90 parts by mass per 100 parts by mass of total of the diene rubber and the nitrone compound, the strength of the compound after vulcanization is insufficient. If the total content of the carbon black and the white filler is greater than 180 parts by mass per 100 parts by mass of total of the diene rubber and the nitrone compound, the low heat build-up of the compound after vulcanization is insufficient.

Second Aspect

As described above, the composition according to the second aspect of the present invention (also simply referred to as the second aspect hereinafter) contains a diene rubber, a carbon black and a white filler. The diene rubber contains a natural rubber and a modified styrene-butadiene rubber (carboxynitrone-modified SBR) that can be obtained by a reaction of a nitrone compound having a carboxy group with a double bond of a styrene-butadiene rubber.

As described above, the second aspect corresponds to an aspect in which SBR in the diene rubber is modified with the carboxynitrone instead of blending carboxynitrone in the first aspect described above.

Diene Rubber

As described above, the diene rubber contained in the second aspect contains a natural rubber and a modified styrene-butadiene rubber (carboxynitrone-modified SBR) that can be obtained by a reaction of a nitrone compound having a carboxy group with a double bond of a styrene-butadiene rubber.

The diene rubber may contain a rubber component besides a natural rubber and a carboxynitrone-modified SBR. Such a rubber component is not particularly limited, but examples thereof include isoprene rubber (IR), butadiene rubber (BR), acrylonitrile-butadiene copolymer rubber (NBR), butyl rubber (IIR), butyl halide rubber (Br-IIR, Cl-IIR), and chloroprene rubber (CR).

Natural Rubber

The natural rubber contained in the diene rubber is not particularly limited.

The content of the natural rubber in the diene rubber is not particularly limited, but preferably from 50 to 90 mass % or greater.

Modified Styrene-Butadiene Rubber

As described above, the diene rubber contains a modified styrene-butadiene rubber (carboxynitrone-modified SBR) that can be obtained by a reaction of a nitrone compound having a carboxy group with a double bond of a styrene-butadiene rubber.

Specific examples and suitable aspects of a styrene-butadiene rubber used for the synthesis of carboxynitrone-modified SBR are the same materials as the styrene-butadiene rubbers contained in the first aspect described above. Also, definitions, specific examples and suitable aspects of a nitrone compound (carboxynitrone) having a carboxy group, which is used for the synthesis of carboxynitrone-modified SBR, are the same as the carboxynitrones contained in the first aspect described above.

A method for producing the modified styrene-butadiene rubber (carboxynitrone-modified SBR) via a reaction of a nitrone compound with a double bond of a styrene-butadiene rubber is not particularly limited, and examples include a method in which the styrene-butadiene rubber and the carboxynitrone are blended together for 1 to 30 minutes at 100 to 200° C.

In the method, a cycloaddition reaction occurs between the double bond of the butadiene contained in the styrene-butadiene rubber and the nitrone group in the carboxynitrone, forming a five-membered ring as illustrated in Formulas (4) and (5) below. Note that Formula (4) below represents a reaction between a 1,4 bond and a nitrone group, and Formula (5) below represents a reaction between a 1,2-vinyl bond and a nitrone group. Formulas (4) and (5) illustrate the reactions for the case where the butadiene is 1,3-butadiene, but the same reaction leads to a formation of a five-membered ring even in the case where the butadiene is other than 1,3-butadiene.

[Chemical Formula 4]

Formula (4)

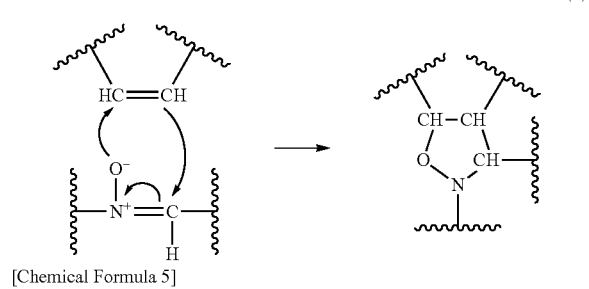

[Chemical Formula 5]

Formula (5)

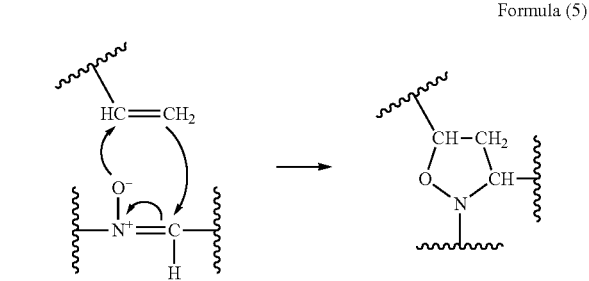

The content of the nitrone compound (carboxynitrone) (also referred to as a converted CPN amount hereinafter) that is used for the synthesis of the modified styrene-butadiene rubber (carboxynitrone-modified SBR) per 100 parts by mass of the diene rubber is from 0.1 to 10 parts by mass. In particular, it is preferably from 0.5 to 5 parts by mass. If the converted CPN amount is out of the range of 0.1 to 10 parts by mass, low heat build-up and/or adhesion is insufficient.

For example, if 40 parts by mass of the carboxynitrone-modified SBR is included in 100 parts by mass of the diene rubber and the carboxynitrone-modified SBR is obtained via the reaction between 100 parts by mass of SBR and 2 parts by mass of carboxynitrone, 0.8 parts by mass (=40×(2/102)) of carboxynitrone is used for the synthesis of the carboxynitrone-modified SBR, which is 40 parts by mass. Thus the converted CPN amount is 0.8 parts by mass.

For the synthesis of the carboxynitrone-modified SBR, the content of the carboxynitrone per 100 parts by mass of SBR is not particularly limited, but it is preferably from 2 to 20 parts by mass and more preferably from 5 to 10 parts by mass.

The degree of modification of the carboxynitrone-modified SBR is not particularly limited, but it is preferably from 0.02 to 4.0 mol % and more preferably from 0.10 to 2.00 mol %. Of these, it is preferably not less than 0.30 mol % and more preferably not less than 0.40 mol %.

Here, "degree of modification" refers to the proportion (mol %) of the double bonds modified with the carboxynitrone relative to all the double bonds attributed to butadiene (butadiene unit) in the styrene-butadiene rubber. For example, if the butadiene is 1,3-butadiene, "degree of modification" refers to the proportion (mol %) of the structure represented by Formula (4) above or Formula (5) above formed by modification with carboxynitrone. The degree of modification, for example, can be found by NMR measurements of the SBRs before and after the modification.

Note that the carboxynitrone-modified SBR with the degree of modification of 100 mol % is also classified as a diene rubber in the present specification.

The content of the carboxynitrone-modified SBR in diene rubber is not particularly limited, but is preferably from 10 to 50 mass % or greater.

The total content of the natural rubber and the carboxynitrone-modified SBR in the diene rubber is not particularly limited, but is preferably not less than 90 mass %.

The mass ratio of the content of the natural rubber and the content of the styrene-butadiene rubber used for the synthesis of the modified styrene-butadiene rubber (carboxynitrone-modified SBR) is from 50:50 to 90:10. In particular, it is preferably from 60:40 to 80:20. If the mass ratio of the content of the natural rubber and the content of the styrene-butadiene rubber used for the synthesis of the carboxynitrone-modified SBR is out of the range from 50:50 to 90:10, low heat build-up and/or adhesion are insufficient.

For example, if the diene rubber contains 60 parts by mass of the natural rubber and 40 parts by mass of the carboxynitrone-modified SBR and the carboxynitrone-modified SBR is obtained via the reaction between 100 parts by mass of SBR and 2 part by mass of carboxynitrone, 39.2 parts by mass (=40×(100/102)) of styrene-butadiene rubber is used for the synthesis of the carboxynitrone-modified SBR, which is 40 parts by mass. Thus the ratio of the content of the natural rubber and the content of the styrene-butadiene rubber used for the synthesis of the modified styrene-butadiene rubber is 60:39.2.

Carbon Black

A carbon black contained in the second aspect is not particularly limited, and the specific examples thereof is the same as the carbon black contained in the first aspect described above. Also, the nitrogen adsorption specific surface area ($N_2SA$) of the carbon black is not particularly limited, and the suitable aspect is the same as the carbon black contained in the first aspect described above.

In the second aspect, the content of carbon black is not less than 70 parts by mass per 100 parts by mass of the diene rubber. In particular, it is preferably from 80 to 150 parts by mass. If the content of carbon black is less than 70 parts by mass per 100 parts by mass of the diene rubber, the strength of the compound after vulcanization is insufficient.

White Filler

A white filler contained in the second aspect is not particularly limited, and the specific examples thereof is the same as the white filler contained in the first aspect described above.

In the second aspect, the content of white filler is not less than 20 parts by mass per 100 parts by mass of the diene rubber. In particular, it is preferably from 40 to 100 parts by mass. If the content of the white filler is less than 20 parts by mass per 100 parts by mass of the diene rubber, the strength of the compound after vulcanization is insufficient.

In the second aspect, the total content of the carbon black and the white filler is from 90 to 180 parts by mass per 100 parts by mass of the diene rubber. In particular, it is preferably from 100 to 160 parts by mass. If the total content of the carbon black and the white filler is less than 90 parts by mass per 100 parts by mass of total of the diene rubber, the strength of the compound after vulcanization is insufficient. If the total content of the carbon black and the white filler is greater than 180 parts by mass per 100 parts by mass of the diene rubber, the low heat build-up of the compound after vulcanization is insufficient.

Optional Components

The composition of the present invention may further contain additives as necessary within a scope that does not inhibit the effect or purpose thereof.

Examples of the additives include various additives that are typically used in rubber compositions, such as silane coupling agents, zinc oxide (flower of zinc), stearic acid, adhesive resin, peptizing agent, anti-aging agents, wax, processing aids, oils, liquid polymers, terpene resins, thermosetting resins, tackifier resins (e.g. Quintone 100 Series manufactured by Nihon Zeon Corp.), vulcanizing agents (e.g. sulfur), and vulcanization accelerators.

Rubber Composition for Tire Bead Insulation

The method for producing the composition of the present invention is not particularly limited, and specific examples thereof include a method whereby each of the above-mentioned components is kneaded using a publicly known method and device (e.g. Bunbury mixer, kneader, roll, and the like). When the composition of the present invention contains a sulfur or a vulcanization accelerator, the components other than the sulfur and the vulcanization accelerator are preferably blended first at a high temperature (preferably 60° C. to 120° C.), then cooled, before the sulfur and the vulcanization accelerator are blended.

In addition, the composition of the present invention can be vulcanized or crosslinked under conventional, publicly known vulcanizing or crosslinking conditions.

Application

The composition of the present invention can be used suitably for a bead insulation portion of a pneumatic tire. That is, the composition of the present invention will be suitably used for production of a bead insulation rubber of a pneumatic tire.

Pneumatic Tire

The pneumatic tire of the present invention is a pneumatic tire that includes the composition of the present invention in the bead insulation portion. That is, the pneumatic tire of the present invention is a pneumatic tire that includes the composition of the present invention in the bead insulation rubber.

FIG. 1 is a partial cross-sectional schematic view of a tire that illustrates one embodiment of the pneumatic tire of the present invention, but the pneumatic tire of the present invention is not limited to the attached drawing.

In FIG. 1, the pneumatic tire is formed from a pair of right and left bead portions 1, a pair of right and left side walls 2, and a tread portion 3 extending between both of the side walls 2. A carcass layer 4 embedded with steel cords is mounted between the bead portions 1, 1. An end of the carcass layer 4 is folded over and up from a tire inner side to a tire outer side around a bead core 5 and a bead filler 6. In the tread portion 3, a belt layer 7 is provided along the entire periphery of the tire on the outer side of the carcass layer 4. At the both end portions of the belt layer 7, belt cushions 8 are provided. In the inner surface of the pneumatic tire, an inner liner 9 is provided to avoid leakage of air charged in the tire inner portion to the outside of the tire. A tie rubber 10 is laminated in between the carcass layer 4 and the inner liner 9 to bond the inner liner 9.

Figure 2:
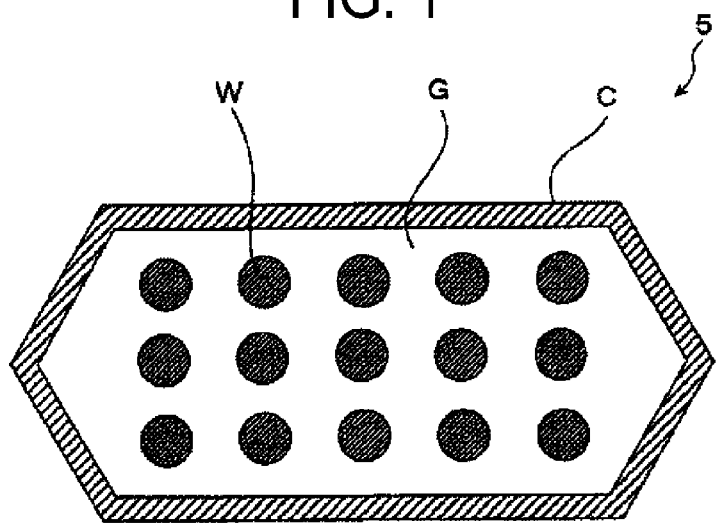
FIG. 2 is an enlarged cross-sectional view of an example of the bead core 5.

FIG. 2 is an enlarged cross-sectional view of an example of the bead core 5.

The bead core 5 is configured with a bead wire W and a bead insulation rubber G which covers the bead wire W. The bead core 5 is formed by winding a plurality of the bead wires W continuously. Also, a bead cover rubber C covers the perimeter of the bead core 5.

The bead wire W is not particularly limited. The examples of the bead wire W includes conventionally known wires.

The bead insulation rubber G is formed from the composition of the present invention described above.

The pneumatic tire of the present invention can be produced, for example, in accordance with a conventionally known method. In addition to ordinary air or air with an adjusted oxygen partial pressure, inert gases such as nitrogen, argon, and helium can be used as the gas with which the tire is filled.

EXAMPLES

Hereinafter, the present invention will be further described in detail with reference to examples; however, the present invention is not limited thereto.

Synthesis of Carboxynitrone

In a 2 L eggplant-shaped flask, methanol heated to 40° C. (900 mL) was placed, and then terephthalaldehydic acid represented by Formula (b-1) below (30.0 g) was added and dissolved. To this solution, a solution in which phenylhydroxylamine represented by Formula (a-1) below (21.8 g) was dissolved in methanol (100 mL) was added and stirred at room temperature for 19 hours. After the completion of stirring, a nitrone compound having a carboxy group (carboxynitrone) represented by Formula (c-1) below (41.7 g) was obtained by recrystallization from methanol. The yield was 86%.

[Chemical Formula 6]

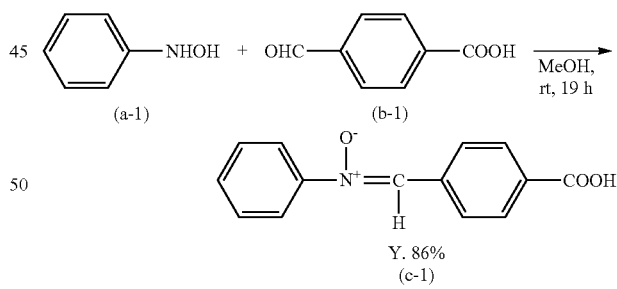

Synthesis of Pyridylnitrone

In a 2 L eggplant-shaped flask, methanol heated to 40° C. (900 mL) was placed, and then 2-pyridinecarboxyaldehyde represented by Formula (b-2) below (21.4 g) was added and dissolved. To this solution, a solution in which phenylhydroxylamine represented by Formula (a-2) below (21.8 g) was dissolved in methanol (100 mL) was added and stirred at room temperature for 19 hours. After the completion of stirring, the nitrone compound (pyridylnitrone) represented by Formula (c-2) below (39.0 g) was obtained by recrystallization from methanol. The yield was 90%. The pyridylnitrone is a nitrone compound which has no carboxy group.

[Chemical Formula 7]

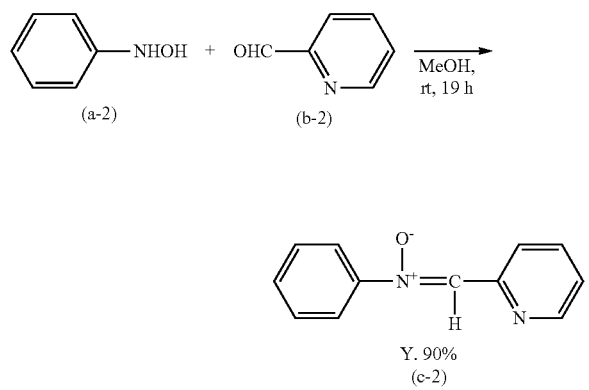

Synthesis of Carboxynitrone-Modified SBR (Modified SBR 1)

SBR (Nipol 1502, manufactured by Nihon Zeon Corp.) was loaded in a Bunbury mixer at 120° C. and masticated for 2 minutes. Then, 2 parts by mass of the carboxynitrone synthesized as above was added per 100 parts by mass of SBR and mixed at 160° C. for 5 minutes to modify the SBR with the carboxynitrone. The carboxynitrone-modified SBR obtained thus is referred to as the modified SBR 1.

The degree of modification was determined by $^1$H-NMR measurement (CDCl$_3$, 400 MHz, TMS) comparing the peak areas in the vicinity of 8.08 ppm (attributed to 2 protons adjacent to the carboxy group) before and after the modification of the SBRs. The degree of modification for the modified SBR 1 was 0.44 mol %.

Synthesis of Carboxynitrone-Modified SBR (Modified SBR 2)

SBR was modified with the carboxynitrone according to the same method as for the modified-SBR 1, except that the content of carboxynitrone was changed from 2 parts by mass to 10 parts by mass, the mixing temperature was changed from 160° C. to 170° C., and the mixing time was changed from 5 minutes to 2.5 minutes. The carboxynitrone-modified SBR obtained thus is referred to as the modified SBR 2.

The degree of modification was determined by $^1$H-NMR measurement (CDCl$_3$, 400 MHz, TMS) comparing the peak areas in the vicinity of 8.08 ppm (attributed to 2 protons adjacent to the carboxy group) before and after the modification of the SBRs. The degree of modification for the modified SBR 2 was 1.38 mol %.

Synthesis of Pyridylnitrone-Modified SBR (Comparative Modified SBR)

SBR was modified with the pyridylnitrone according to the same method as for the modified-SBR 1, except that the pyridylnitrone synthesized as above was blended instead of carboxynitrone. The pyridylnitrone-modified SBR obtained thus is referred to as the comparative modified SBR.

The degree of modification (a proportion of double bonds modified with pyridylnitrone relative to all the double bonds attributed to butadiene in SBR) was determined by $^1$H-NMR measurement (CDCl$_3$, 400 MHz, TMS) comparing the peak areas attributed to a pyridyl group. The degree of modification for the comparative modified SBR was 0.48 mol %.

Preparation of Rubber Composition for Tire Bead Insulation

The components shown in Tables 1 below were compounded in the proportions (part by mass) shown in Table 1 below.

Specifically, the components shown in Table 1 below except for the sulfur and the vulcanization accelerator were first mixed in a Bunbury mixer with a temperature of 80° C. for 5 minutes. Thereafter, a roll was used to mix the sulfur and the vulcanization accelerator to obtain each rubber composition for tire bead insulation ("rubber composition for tire bead insulation" is also referred to as "rubber composition" hereinafter).

For the modified SBR 1 in Table 1, the values listed at the top within the cell are the values for parts by mass of modified SBR 1, and the values listed at the bottom (in parentheses) are the values for parts by mass of SBR used for the synthesis of modified SBR 1, the parts by mass of which is listed above. The same applies to the modified SBR 2 and the comparative modified SBR.

Note that Working Examples 1 and 2 correspond to the second aspect described above and Working Example 3 correspond to the first aspect described above.

Preparation of Vulcanized Rubber Sheet

A vulcanized rubber sheet was prepared by press-vulcanizing each of the obtained (unvulcanized) rubber compositions for 15 minutes at 160° C. in a mold (15 cm×15 cm×0.2 cm).

Evaluation of Heat Build-Up

The loss tangent at a temperature of 60° C., tan δ (60° C.), was measured for the obtained vulcanized product in each example using a viscoelastic spectrometer (manufactured by Toyo Seiki Seisaku-sho, Ltd.) under the following conditions: 10% initial distortion, ±2% amplitude, and 20 Hz frequency. The results are shown in Table 1 (Heat Build-up). The results were shown as index values, with the tan δ (60° C.) of Comparative Example 1 expressed as 100. Smaller values indicate superior low heat build-up.

Evaluation of Adhesion

According to ASTM D2229, the force required to pull a steel wire from each of the rubber compositions was determined.

Specifically, a sample for measuring the force was prepared using the rubber composition obtained and a tin-plated bead wire (ϕ1.55 mm) (vulcanization conditions: 160° C., 15 minutes). The force required to pull a steel wire was measured for the samples obtained. The ratio of rubber residues on the wire pulled out of the sample was rated (from 0 to 100%). The results are shown in Table 1 (Adhesion). The results were expressed as index values, with the result of Comparative Example 1 defined as 100. Greater values indicate the better adhesion.

Note that, converted nitrone amounts in Table 1 refer to the converted CPN amounts described above (Working Examples 1 and 2), and parts by mass of pyridylnitrone used for the synthesis of the comparative modified SBR per 100 parts by mass of the diene rubber (Comparative Example 2).

The degree of modification in Table 1 refers to the degree of modification described above. Note that, for examples using pyridylnitrone, the degree of modification refers to the proportion (mol %) of the double bonds modified with pyridylnitrone relative all the double bonds attributed to butadiene in the SBR.

TABLE 1

|  | Comparative Example 1 | Comparative Example 2 | Working Example 1 | Working Example 2 | Working Example 3 |
|---|---|---|---|---|---|
| Natural rubber | 60 | 60 | 60 | 60 | 60 |
| SBR | 40 |  |  |  | 39.2 |
| Modified SBR 1 |  |  | 40 (39.2) |  |  |
| Modified SBR 2 |  |  |  | 40 (36.4) |  |
| Comparative Modified SBR |  | 40 (39.2) |  |  |  |
| Carboxynitrone |  |  |  |  | 0.8 |
| Carbon black | 80 | 80 | 80 | 80 | 80 |
| Clay | 50 | 50 | 50 | 50 | 50 |
| Zinc oxide | 3 | 3 | 3 | 3 | 3 |
| Stearic acid | 2 | 2 | 2 | 2 | 2 |
| Resin | 3 | 3 | 3 | 3 | 3 |
| Oil | 12 | 12 | 12 | 12 | 12 |
| Vulcanization accelerator | 1 | 1 | 1 | 1 | 1 |
| Sulfur | 5 | 5 | 5 | 5 | 5 |
| Converted nitrone amount (part by mass) | — | 0.8 | 0.8 | 3.6 | — |
| Modification condition | — | 160° C. 5 minutes | 160° C. 5 minutes | 170° C. 2.5 minutes | — |
| Degree of modification | — | 0.48 | 0.44 | 1.38 | — |
| Heat build-up (index) | 100 | 92 | 88 | 83 | 96 |
| Adhesion (index) | 100 | 88 | 110 | 107 | 103 |

The details of each component shown in Table 1 above are as follows.
Natural rubber: TSR20
SBR: Nipol 1502 (styrene unit content: 23.5 mass %, Mw: 450,000, manufactured by Nihon Zeon Corp.)
Modified SBR 1: modified SBR 1 synthesized as described above
Modified SBR 2: modified SBR 2 synthesized as described above
Comparative Modified SBR: comparative modified SBR synthesized as described above
Carboxynitrone: carboxynitrone synthesized as described above
Carbon Black: Niteron#GN ($N_2SA$: $32 \times 10^3$ $m^2/kg$, NSCC Carbon Co., Ltd.)
Clay: Katarupo Y-K (manufactured by Sanyou Clay Industrial Co., Ltd)
Zinc oxide: Zinc Oxide III (manufactured by Seido Chemical Industry Co., Ltd.)
Stearic acid: Stearic acid YR (manufactured by NOF Corporation)
Resin: Quitone A100 (manufactured by Zeon Corporation)
Oil: Extract No. 4 S (manufactured by Showa Shell Seikyu K.K.)
Vulcanization accelerator: Nocceler CZ-G (manufactured by Ouchi Shinko Chemical Industrial Co., Ltd.)
Sulfur: oil treatment sulfur (manufactured by Karuizawa Refinery Ltd.)

As is evident from Table 1, Working Example 3 (which contained carboxynitrone) and Working Examples 1 and 2 (which contained carboxynitrone-modified SBR) exhibited superior low heat build-up and superior adhesion, compared to Comparative Examples 1 (which contained neither carboxynitrone nor carboxynitrone-modified SBR). Among these, Working Examples 1 and 2 (which contained carboxynitrone-modified SBR) exhibited even superior low heat build-up and even superior adhesion.

Comparative Example 2, which contained neither carboxynitrone nor carboxynitrone-modified SBR but contained the modified SBR other than a carboxynitrone-modified SBR (the SBR modified with pyridylnitrone), exhibited insufficient adhesion.

REFERENCE SIGNS LIST

1 Bead portion
2 Sidewall portion
3 Tread portion
4 Carcass layer
5 Bead core
6 Bead filler
7 Belt layer
8 Belt cushion
9 Innerliner
10 Tie rubber
G Bead Insulation Rubber
W Bead Wire
C Bead Cover Rubber

The invention claimed is:

1. A rubber composition for tire bead insulation comprising a diene rubber, a nitrone compound having a carboxy group, a carbon black and a white filler;
the diene rubber containing a natural rubber and a styrene-butadiene rubber, wherein a mass ratio of a content of the natural rubber and a content of the butadiene rubber is from 50:50 to 90:10;
a content of the nitrone compound being from 0.1 to 10 parts by mass per 100 parts by mass of a total content of the diene rubber and the nitrone compound;
a content of the carbon black being not less than 70 parts by mass per 100 parts by mass of a total content of the diene rubber and the nitrone compound;
a content of the white filler being not less than 20 parts by mass per 100 parts by mass of a total content of the diene rubber and the nitrone compound; and
a total content of the carbon black and the white filler being from 90 to 180 parts by mass per 100 parts by mass of a total content of the diene rubber and the nitrone compound.

2. The rubber composition for tire bead insulation according to claim 1, wherein a styrene unit content of the styrene-butadiene rubber is not less than 10 mass %.

3. The rubber composition for tire bead insulation according to claim 1, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

4. The rubber composition for tire bead insulation according to claim 3, wherein a styrene unit content of the styrene-butadiene rubber is not less than 10 mass %.

5. A pneumatic tire wherein the rubber composition for tire bead insulation described in claim 1 is used in a bead insulation portion.

6. A pneumatic tire wherein the rubber composition for tire bead insulation described in claim 3 is used in a bead insulation portion.

7. A pneumatic tire wherein the rubber composition for tire bead insulation described in claim 2 is used in a bead insulation portion.

8. A rubber composition for tire bead insulation comprising a diene rubber, a carbon black and a white filler;
the diene rubber containing a natural rubber and a modified styrene-butadiene rubber wherein the modified styrene-butadiene rubber is obtained by a reaction of a nitrone compound having a carboxy group with a double bond of a styrene-butadiene rubber;
a mass ratio of a content of the natural rubber and a content of a styrene-butadiene rubber used for a synthesis of the modified styrene-butadiene rubber is from 50:50 to 90:10;
a content of the nitrone compound used for a synthesis of the modified styrene-butadiene rubber being from 0.1 to 10 parts by mass per 100 parts by mass of the diene rubber;
a content of the carbon black being not less than 70 parts by mass per 100 parts by mass of the diene rubber;
a content of the white filler being not less than 20 parts by mass per 100 parts by mass of the diene rubber; and
a total content of the carbon black and the white filler being from 90 to 180 parts by mass per 100 parts by mass of the diene rubber.

9. The rubber composition for tire bead insulation according to claim 8, wherein a styrene unit content of the styrene-butadiene rubber is not less than 10 mass %.

10. The rubber composition for tire bead insulation according to claim 8, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

11. The rubber composition for tire bead insulation according to claim 10, wherein a styrene unit content of the styrene-butadiene rubber is not less than 10 mass %.

12. The rubber composition for tire bead insulation according to claim 8, wherein a degree of modification of the modified styrene-butadiene rubber is from 0.02 to 4.0 mol %, wherein "degree of modification" refers to a proportion (mol %) of double bonds modified with the nitrone compound relative to all the double bonds attributed to butadiene in the styrene-butadiene rubber.

13. The rubber composition for tire bead insulation according to claim 12, wherein a styrene unit content of the styrene-butadiene rubber is not less than 10 mass %.

14. The rubber composition for tire bead insulation according to claim 12, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

15. The rubber composition for tire bead insulation according to claim 14, wherein a styrene unit content of the styrene-butadiene rubber is not less than 10 mass %.

16. A pneumatic tire wherein the rubber composition for tire bead insulation described in claim 8 is used in a bead insulation portion.

17. A pneumatic tire wherein the rubber composition for tire bead insulation described in claim 12 is used in a bead insulation portion.

18. A pneumatic tire wherein the rubber composition for tire bead insulation described in claim 10 is used in a bead insulation portion.

19. A pneumatic tire wherein the rubber composition for tire bead insulation described in claim 14 is used in a bead insulation portion.

20. A pneumatic tire wherein the rubber composition for tire bead insulation described in claim 9 is used in a bead insulation portion.

* * * * *